Figure 1:
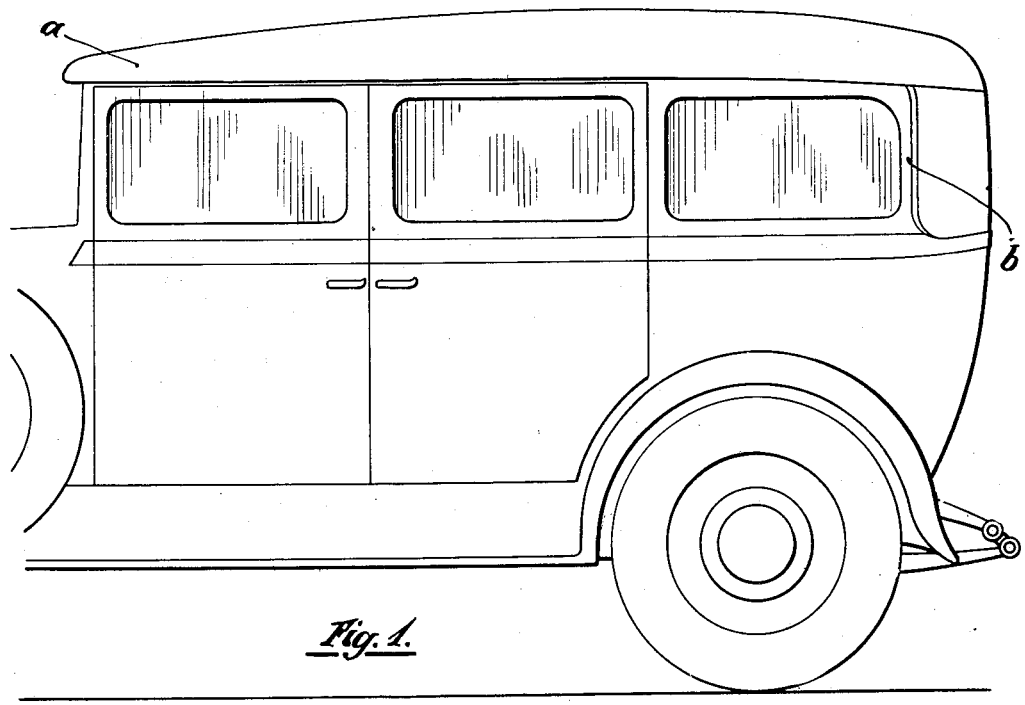

Nov. 21, 1933.   W. REUTTER   1,935,993
CARRIAGE BODY FOR AUTOMOBILES
Filed Dec. 10, 1930   3 Sheets-Sheet 1

Inventor:
Wilhelm Reutter
by
Attorney.

Nov. 21, 1933.  W. REUTTER  1,935,993
CARRIAGE BODY FOR AUTOMOBILES
Filed Dec. 10, 1930  3 Sheets-Sheet 2

Inventor:
Wilhelm Reutter
by [signature]
Attorney.

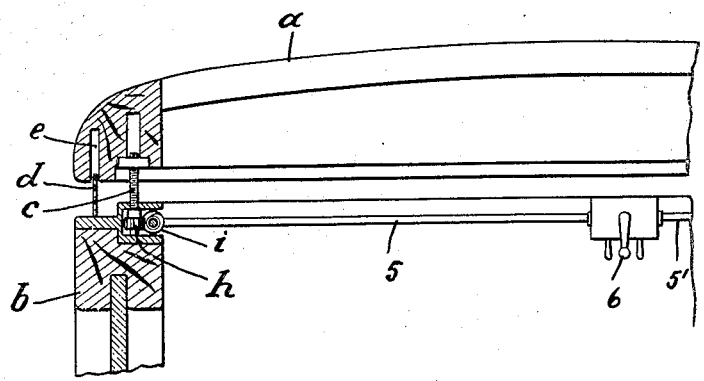
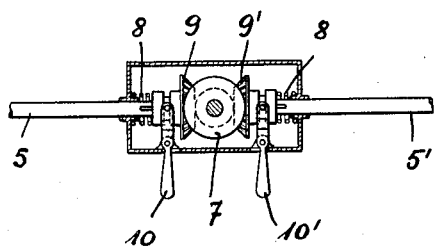

UNITED STATES PATENT OFFICE 1,935,993

CARRIAGE BODY FOR AUTOMOBILES

Wilhelm Reutter, Stuttgart, Germany

Application December 10, 1930, Serial No. 501,359, and in Germany February 18, 1929

3 Claims. (Cl. 296—107)

This invention relates to carriage bodies for automobiles and has particularly for its object to provide a carriage body permitting to enlarge during travel the interior limited space of a closed carriage such as, for instance, the carriage of limousines, landaulets and the like, by raising the top in warm weather to permit convenient ventilation of the interior of the car in the upper space of the carriage body and to again lower said top in cool weather.

Ventilation devices are known to be used in connection with carriage bodies having a fixed top. Devices of this kind, however, are not sufficient to bring about proper ventilation. Such devices, moreover, are in general bodies separate from the top of the carriage body.

According to my invention the top of the carriage body is constructed to be raised as a whole by means of a lifting device mounted on the lateral walls of the carriage body permitting an ample quantity of air to enter the upper space of the car and again discharge from said space. In contra-distinction to this construction of carriage bodies in which the top may be taken-off or raised in order to enlarge the interior of the car and to provide additional space permitting the carriage body to be used as a living room during standstill of the car, according to my invention the top is positively connected with both lateral walls of the carriage body in a manner permitting raising and lowering of the top during travel and travel of the car with the top raised. Preferably, in this case an intermediate member which is pervious to air, for instance, gauze or a texture with coarse meshes, a wire netting, a foraminated metal sheet, fabrics and textures having reinforcements of wire or foraminated sheet-metal and the like is provided intermediate the raised top and the upper edges of the carriage body. In this manner said intermediate foraminated or air-pervious member will automatically fill-up the interstice between the upper walls of the carriage body and the top in raised condition of the latter.

This intermediate member serves in particular to reduce the air-draught and to prevent dust, soil, foreign bodies, insects and the like against entering the interior of the car. The said intermediate member, moreover, is fixed with its upper edge on the liftable top and with its under edge to the upper rim of the walls of the carriage body and in addition is connected with the top and the upper rim of the walls of the carriage body to permit automatic folding, when lowering the top. As an alternative of this construction, said intermediate member may also consist, instead of a soft pliable material, permitting folding, of a rigid material and in this case a groove is provided round the under edge of the top and round the upper rim of the walls of the carriage body, said grooves permitting reception of said rigid intermediate member in lowered condition of the top.

My present invention may be advantageously used in connection with automobiles of various types, such as for instance, limousines, landaulets and so forth and in connection with various forms of construction of several forms of carriage bodies. An example of a construction of a carriage body provided according to my invention with a top which may be raised and lowered is shown in the accompanying drawings of which Fig. 1 is a partial lateral view of an automobile having a carriage body of the ordinary type with a relatively low top in lowered condition, Fig. 2 a similar lateral view of the carriage body with the top in raised condition, Fig. 3 a rear view taken on Fig. 2 and Fig. 4 an enlarged, partial broken-away cross-section through a special form of construction of the top and the upper rims of the walls of the carriage body as well as of the said intermediate member between said top and the upper rim of the carriage body, Fig. 5 a similar enlarged partial vertical section through the upper left-hand part of Fig. 3 showing in particular the mechanism by means of which the top of the carriage body may be raised and lowered and Fig. 6 a detail showing part of said mechanism.

The top $a$ may be made of a rigid or flexible material. The ribs which are used as re-enforcing members for the top, as a rule are fixedly connected therewith. Said ribs, however, may also be made detachable and in every case a proper coating or covering is used on the interior surface of the top $a$. According to my invention now the top $a$ is not fixed to the upper rims of the walls of the carriage body and specially constructed lifting and lowering devices, such as for instance lifting spindles $c$, are interposed between said top $a$ and the carriage body permitting according to demand to raise and lower the top $a$ of the carriage body.

As shown in Fig. 5 a plurality of vertical lifting spindles $c$ are provided alongside the upper rim of the walls of the carriage-body, said lifting spindles $c$ being mounted at their under ends within a recess in the walls of the carriage-body. Each of the lifting spindles $c$ carries a worm $h$ engaging with a worm-gear $i$ mounted on the operating spindle 2. The operating spindles 2 may be rotated by means of a pair of bevel gears (not shown) and transverse shafts 5 and 5' carrying said bevel gears, said transverse shafts being mounted at the front of the carriage-body. In order to operate the shafts 5 and 5' there may be used a handle 6 and a bevel-gear drive shown in Fig. 6. The shaft on which the crank 6 is mounted carries a gear 7 which engages ordinarily by action of pressure springs 8 with the bevel gears 9 and 9' which are mounted longitudinally displaceably on the shafts 5 and 5', respectively.

If it is desired to raise the top $a$ only at one of its sides, either the bevel gear 9 or 9' must be caused to engage with the bevel gear 7. For this purpose operating levers 10 and 10' are provided within the casing for the bevel gears 7, 9 and 9', said operating levers being mounted to permit swinging motion thereof. In order to maintain the mechanism in disengaged condition of the bevel gears a locking device (not shown) serves for retaining the operating levers 10 and 10' in position to keep said mechanism in this condition.

Figure 2:
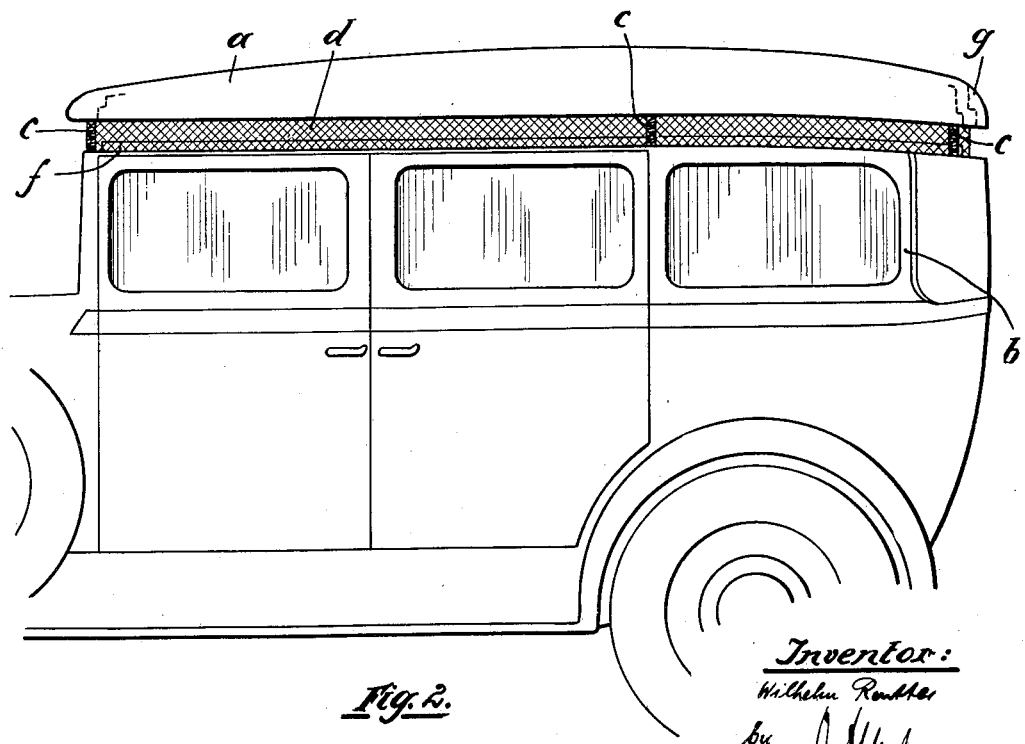
Figure 3:
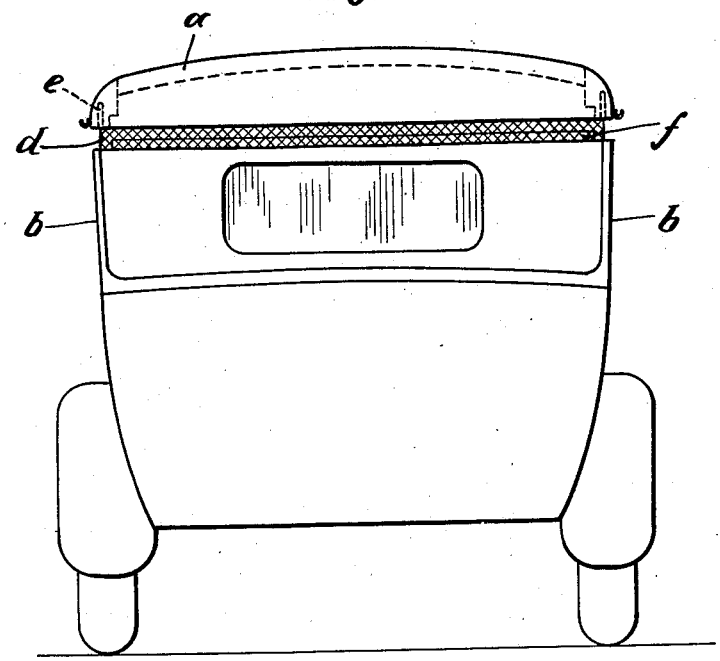

If the top $a$ is lifted from the position shown in Fig. 1 into the position shown in Fig. 2, apparently the height of the interior space of the car will be essentially increased, and in addition to this, an efficient ventilation will be provided by the gap or interstice between the lifted top $a$ and the upper rims of the walls of the carriage body. The thus gained increase of the height and volume of the interior space of the car according to my invention is separated from the outside by means of the aforementioned intermediate member $d$ which consists of a material which is pervious to air, for instance a wire netting or the like, which is pliable to permit automatic folding, when lowering the top $b$ and in like manner expand automatically when raising said top. Also the said intermediate member $d$ may be arranged to enter into grooves provided on the upper rim of the carriage body and the under edges of the top $a$ in lowered condition of the latter. An intermediate member $d$ in the form of a wire netting or some other structure which is pervious to air will prevent soil, dust, foreign bodies or the like against entering the interior of the car and in addition provide agreeable ventilation by more or less suppressing the air-draught which may enter the car in raised position of the top $a$.

The lifting mechanism for the top $a$ may also be constructed to permit said top to be lifted only at one of its sides, while the other side may be kept closed for the purpose of preventing heavy lateral winds against entering the interior of the car. In like manner the top $a$ may be lifted only at the rear or only at the front, or the top $a$ may be lifted at any part thereof and the other part of said top retained in lowered position. Apparently the top $a$ of the carriage body may be raised by means of a proper lifting device to any desired height which may be chosen entirely as desired on the part of the passengers.

Figure 4:
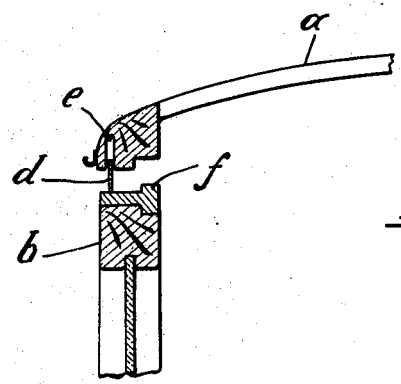

The gap or interstice between the top $a$ when in raised condition and the walls of the carriage-body may be placed at any desired height above the windows of the car, irrespective of the fact whether the top is raised uniformly or only on one side or on the rear or front. Most preferably, said gap or interstice may be of the conformation as shown in Fig. 4 in which the upper rims of the walls $b$ of the carriage body are provided with a projecting portion $f$ which registers with a recess $f_1$ of similar conformation at the under edges of the top $a$. This form of gap between the carriage-body and the top will have the advantage that there will be no interstice between the outer contacting edges of the top and the carriage body in lowered position of the top, which will effectively prevent rain against entering the car in lowered condition of the top.

Fig. 4 shows the aforementioned conformation of the upper rim of the walls of the carriage body and of the under edges of the top $a$ as well as the intermediate member $d$ which may consist of a wire netting, a texture or fabric or other structure pervious to air and a groove $e$ provided around the under edge of the top $a$ permitting reception of said intermediate member $d$ in lowered condition of the top $a$. In Fig. 4 a rigid material is chosen for the intermediate member $d$, said member being fixed to the upper rim of the walls of the carriage-body. In lowered condition of the top $a$ the gap or interstice between the latter and the upper rims of the carriage-body will fully disappear so that the carriage-body together with the top presents the appearance of an ordinary carriage-body with fixed top. In lowered condition of the top $a$ the member $d$ will be fully concealed from view and positioned within the groove $e$ provided along the edges of the top $a$. In order to provide additional safety against entrance of rain through the closed gap or joint between the top $a$ and the carriage-body, also a greater number of alternate projections $f$ and depressions $f_1$ may be provided along the upper rim of the carriage body and the under edge of the top $a$. Furthermore, ledges $g$ as indicated in Fig. 2, may be fastened round the edges of the top $a$, said ledges serving to improve the appearance of the gap or joint between the carriage body and the top in lowered condition of the latter. In addition to this, said ledges $g$ will provide additional protection against entrance of rain in lowered condition of the top $a$. The construction of the intermediate member $d$ of rigid material, as shown in Fig. 4 will have the advantage that it will also present a smooth appearance, in case the top $a$ is only slightly lifted. Also, an intermediate member $d$ of the form shown in Fig. 4 will be subject to wear to a considerably smaller degree, in contra-distinction to the aforementioned pliable or flexible intermediate member $d$ which during lifting and lowering of the top $a$ will be expanded and folded together, respectively.

I claim:

1. In a carriage body for automobiles and the like having sides and a top separate from said sides, means for raising and lowering said top with respect to said sides, and a rigid intermediate member pervious to air and interposed between said top and said sides, said intermediate member being fixed to the sides and slidably engaging the top and automatically maintaining constant engagement with the top in all adjusted positions of the latter.

2. In a carriage body for automobiles and the like having sides and a top separate from said sides, means for raising and lowering said top with respect to said sides, and a rigid intermediate member pervious to air and interposed between said top and said sides, said intermediate member being fixed to the sides and slidably engaging the top and automatically maintaining constant engagement with the top in all adjusted positions of the latter, the said top having a groove in its lower face snugly receiving the said intermediate member in all positions of the top.

3. In a carriage body for automobiles and the like having sides and a top separate from said sides, means for raising and lowering said top with respect to said sides, and a rigid intermediate member pervious to air and interposed between said top and said sides, said intermediate member being fixed to the sides and slidably engaging the top and automatically maintaining constant engagement with the top in all adjusted positions of the latter, and interengaging offset portions on the contacting faces of the sides and top disposed beside the intermediate member to provide a water-tight joint between the carriage sides and the top when this latter is in lowered position.

WILHELM REUTTER.